United States Patent
Helkiö et al.

(10) Patent No.: US 7,523,869 B2
(45) Date of Patent: Apr. 28, 2009

(54) PORTABLE ELECTRONIC DEVICE MEMORY AVAILABILITY

(75) Inventors: Risto Helkiö, Espoo (FI); Jukka-Pekka Salmenkaita, Hampshire (GB); Pirjo Moilanen, Espoo (FI)

(73) Assignee: Nokia Corporation, Espoo (FI)

( * ) Notice: Subject to any disclaimer, the term of this patent is extended or adjusted under 35 U.S.C. 154(b) by 843 days.

(21) Appl. No.: 11/101,274

(22) Filed: Apr. 6, 2005

(65) Prior Publication Data
US 2006/0226232 A1 Oct. 12, 2006

(51) Int. Cl.
G06K 7/10 (2006.01)
(52) U.S. Cl. .............................. 235/472.01; 235/472.02; 235/462.24; 235/462.25; 235/462.41
(58) Field of Classification Search ............ 235/472.01, 235/472.02, 462.24, 462.25, 462.41
See application file for complete search history.

(56) References Cited

U.S. PATENT DOCUMENTS

| | | | |
|---|---|---|---|
| 7,158,251 B2* | 1/2007 | Schinner | 358/1.15 |
| 7,287,088 B1* | 10/2007 | Anderson | 709/235 |
| 2003/0030733 A1* | 2/2003 | Seaman et al. | 348/239 |
| 2004/0075750 A1 | 4/2004 | Bateman | 348/231.1 |
| 2004/0201737 A1 | 10/2004 | Baron et al. | 348/231.2 |
| 2004/0212698 A1* | 10/2004 | Kito | 348/231.99 |
| 2008/0192129 A1* | 8/2008 | Walker et al. | 348/231.2 |

FOREIGN PATENT DOCUMENTS

| | | |
|---|---|---|
| EP | 0 298 446 A2 | 1/1989 |
| EP | 0 298 446 A3 | 1/1989 |
| EP | 0 298 446 B1 | 1/1989 |

* cited by examiner

Primary Examiner—Michael G Lee
Assistant Examiner—Kristy A Haupt
(74) Attorney, Agent, or Firm—Harrington & Smith, PC

(57) ABSTRACT

A portable electronic device including a memory having a first image file; a system for transferring a copy of the first image file to a second device; and a system for permanently converting the first image file to a different second image file. The system for permanently converting is based, at least partially, upon the copy of the first image file being transferred to the second device by the system for transferring. The second image file cannot be converted back to the first image file by the portable electronic device.

22 Claims, 3 Drawing Sheets

US 7,523,869 B2

PORTABLE ELECTRONIC DEVICE MEMORY AVAILABILITY

BACKGROUND OF THE INVENTION

1. Field of the Invention

The present invention relates to memory in a portable electronic device and, more particularly, to a system and method for making memory space available.

2. Brief Description of Prior Developments

Nokia Corporation offers a PC connectivity tool (PC Suite) that makes it possible to connect a phone to a computer, such as a personal computer (PC). With PC Suite a phone can appear as a removable disk drive in the operating system of the PC. Then it is possible for the user to copy image/video files from the phone to the PC using tools provided by PC operating system (for example, Windows Explorer, etc.). It is also possible to develop software on top of PC Suite that takes care of image transfer. Examples of these are done by Adobe, and HP.

It is possible to detach a memory card from the phone and install it into a card reader that is attached to a PC. Again the memory card will appear as a removable disk of the PC and images can be copied.

U.S. Patent Publication No. US2004201737 describes an image capturing device including a processor, at least one interface, and a memory. The memory is capable of storing a plurality of records. A record includes image storage data, date/time data, and status data. The processor determines whether any of the images in the memory have been archived as indicated by the status information in the status storage cell of the records, and replaces one or more archived images with newly captured images as the device is used. This discloses the use of a "flag" in order to determine which previously saved items can be deleted, as they have been stored elsewhere.

EP0298446 describes reduction in image quality in order to be printed by a device with limited buffer memory. The publication outlines that it is possible to reduce images already stored in order to make sure it can be forwarded via a smaller buffer. The choosing of which images to be "shrunk" is based on the use of a flag, similar to US2004201737. However, because this European application relates to the deletion of images it does not relate to the advantage that all images can be retained in some format within a handset.

U.S. Patent Publication No. US2004075750 describes auto changing of the quality settings when the memory card becomes full.

SUMMARY OF THE INVENTION

In accordance with one aspect of the present invention, a portable electronic device is provided including a memory having a first image file; a system for transferring a copy of the first image file to a second device; and a system for permanently converting the first image file to a different second image file. The system for permanently converting is based, at least partially, upon the copy of the first image file being transferred to the second device by the system for transferring. The second image file cannot be converted back to the first image file by the portable electronic device.

In accordance with another aspect of the present invention, a system is provided for making backup copies of image files from a first portable electronic device to a second device. The system comprises a system for coupling the first portable electronic device to the second device; a system for determining first ones of the image files in the first portable electronic device which have been copied or transmitted from the first portable electronic device and for determining second ones of the image files which have not been copied or transmitted from the first portable electronic device; and a system for selectively copying or transmitting the second image files in the first portable electronic device, which have not been previously copied or transmitted from the first portable electronic device, to the second device based, at least partially, on the system for determining without copying or transmitting the first image files to the second device at a same time.

In accordance with one method of the present invention, a method for making memory available in a portable electronic device is provided comprising organizing entertainment files into classifications; providing user rules for prioritization of deletion or permanent re-sizing of the entertainment files based, at least partially, upon the classifications of the entertainment files; and providing a user with a suggestion of at least one of the entertainment files for deletion or permanent re-sizing based upon a predetermined event, the prioritization rules, and the classifications of the entertainment files.

In accordance with another method of the present invention, a method for making memory space available in a first portable electronic device is provided comprising transmitting a copy of a first entertainment file from the first portable electronic device to a second device; and permanently re-sizing the first entertainment file in the first portable electronic device into a second re-sized entertainment file based, at least partially, upon a determination that the first entertainment file has been copied, wherein the second re-sized entertainment file cannot be converted back to the first entertainment file by the first portable electronic device.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
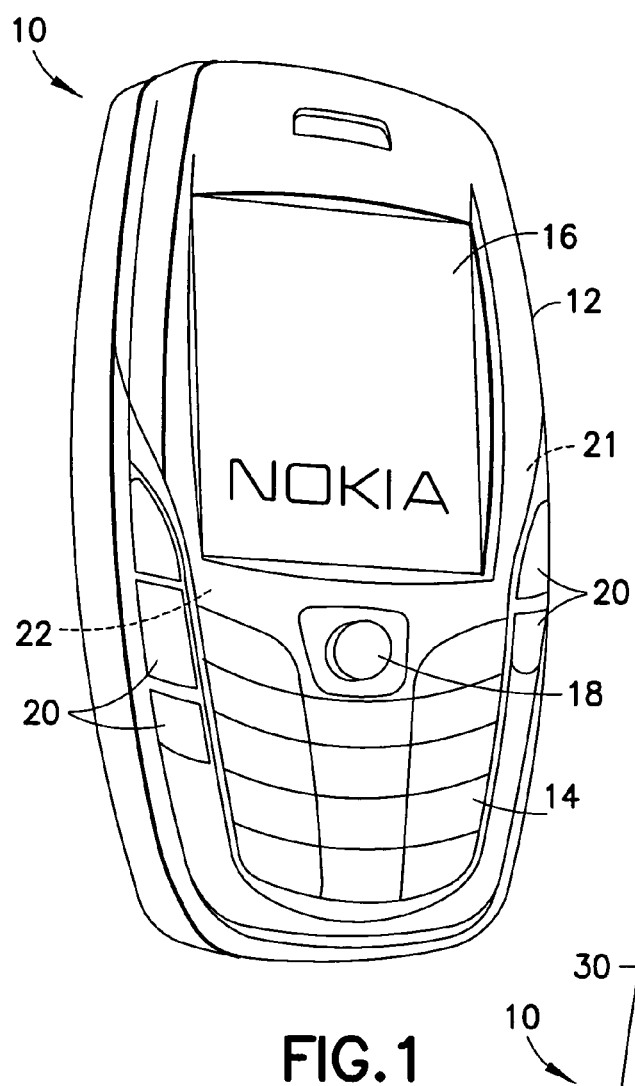
FIG. 1 is a perspective view of a mobile telephone incorporating features of the present invention.

Referring to FIG. 1, there is shown a perspective view of a portable electronic device 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The portable electronic device 10, in the embodiment shown, comprises a mobile telephone. In alternate embodiments, the portable electronic device could comprise any suitable type of mobile electronic device including, for example, a PDA, a laptop computer, or an electronic game. Features of the present invention could also be incorporated into other types of electronic devices, such as a stand-alone digital camera adapted to be connected to a desktop computer or personal computer, for example.

Figure 2:
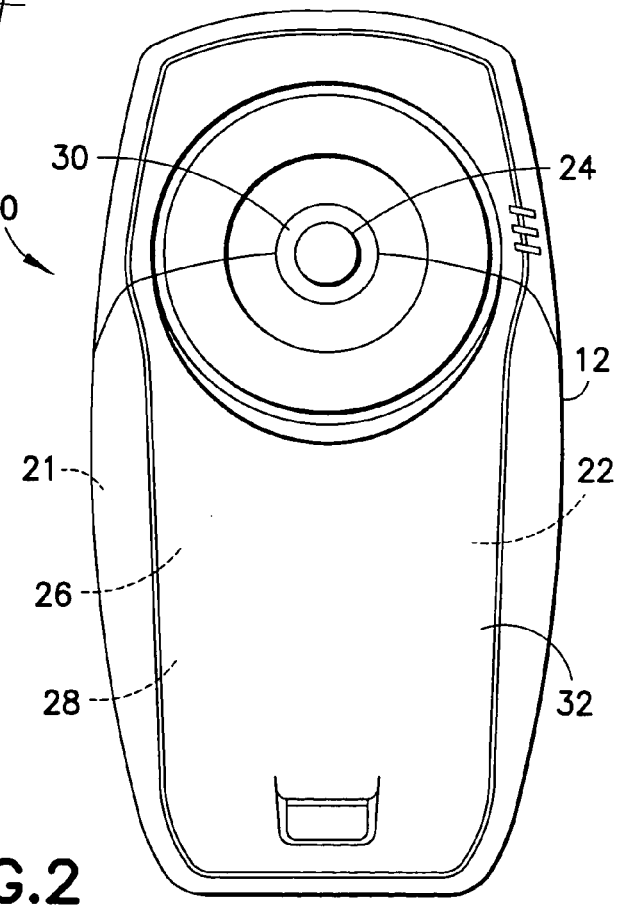
FIG. 2 is a rear side view of the mobile telephone shown in FIG. 1.

Referring also to FIG. 2, the mobile telephone 10 generally comprises a housing 12, a keypad 14, a display 16, a joystick 18, control keys 20, an antenna 21, a digital camera or camera module 24, and electronic circuitry 22 located inside the housing and operably coupled to these components. In alternate embodiments the portable electronic device 10 could comprise additional or alternative components. The electronic circuitry includes a printed wiring board 28 and a transceiver 26 mounted on the printed wiring board which is connected to the antenna 22. In this embodiment the telephone 10 has a camera window or lens 30 located at a rear side 32 of the housing 12. However, in alternate embodiments, the telephone could have its camera window located at any suitable side of the telephone.

Figure 3:
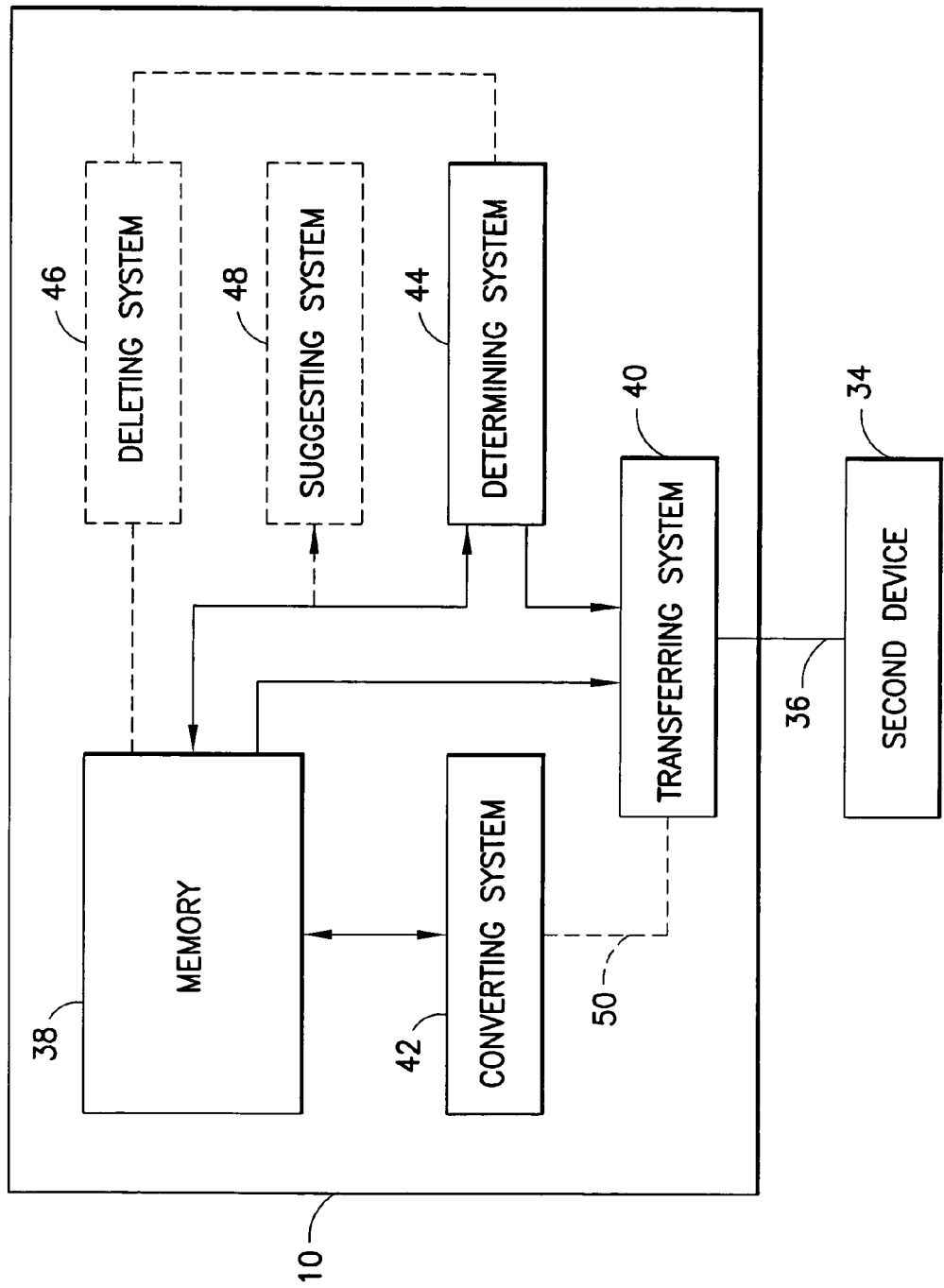
FIG. 3 is a block diagram of features of the mobile telephone shown in FIGS. 1 and 2, shown connected to a second device.

Referring also to FIG. 3, a block diagram of the device 10, showing some of the components of the device 10 in block form, is shown coupled to a second device 34 by a connection or link 36. The device 10 comprises a memory 38, a transferring system 40, a converting system 42 and a determining system 44. Optionally, the device 10 can comprise a deleting system 46 and a suggesting system 48. The memory 38 is adapted to store files, such as entertainment files. Entertainment files can comprise, for example, image files and music files. Image files can comprise, for example, digital picture images and video images. For example, pictures and/or video taken by the camera 24 can be stored in the memory 38 as image files.

The transferring system 40 is adapted to transfer the entertainment files or copies of the entertainment files from the first device 10 to the second device 34 via the connection or link 36. The transferring system could comprise any suitable type of coupling system such as an electrical connector, or use of the antenna 21 and transceiver 26, for example. The second device 34 could comprise any suitable type of electronic device or system, such as a personal computer, or another portable electronic device, or a service provider mass memory for example. The connection or link 36 could comprise any suitable type of connection such as a USB cable, or a wireless Bluetoqth connection, or a wireless radio telephone connection for example.

The transferring system 40 is adapted to transmit a copy of one or more of the entertainment files in the memory 38 to the second device 34 via the link 36. The transfer of entertainment files from the first device 10 to the second device 34 could be automatic or user actuated. For example, the entertainment files in the memory 38 (or a select ones of the entertainment files in the memory 38) could be automatically transmitted to the second device 34 when the link 36 is established. As another example, the entertainment files in the memory 38 (or a select ones of the entertainment files in the memory 38) could be transmitted to the second device 34 when the link 36 is established only after a user prompt and user section of the action.

In a preferred embodiment of the present invention, at least one of the entertainment files transmitted to the second device 34 from the first device 10 is converted by the converting system 42 from a first entertainment file to a second different entertainment file. For example, the first entertainment file could be a picture taken by the camera 24 in the form of a JPEG file having a first size, such as 1600×1200 pixels. The converting system 42 is adapted to permanently re-size the JPEG file into a smaller size, such as 800×600 pixels. This could be a 4:1 savings in required memory (5760000 bites versus 1440000 bites). More or less size reductions could be provided. Selection of actual size reductions could also be automatically variable based upon the type of file; JPEG, MPEG, etc. Resolution could also be changed, such as from 24 bit True Color to 8 Bite Palette (256 color) or 8 Bite grayscale for example. Alternatively, at least one of the entertainment files transmitted to the second device 34 from the first device 10 could be deleted from the memory 38 by the optional deleting system 46.

The converting system 42 could be automatic and/or could be a user actuated system. For example, an automatic system could comprise the converting system 42 being coupled to the transferring system 40 as indicated by line 50 to signal the converting system 42 when an entertainment file has been transmitted to the second device 34. Preferably, the transferring system 40 would not send a signal on line 50 until the second device 34 confirmed receipt of the backup copy of the first entertainment file. The converting system 42 could then automatically convert the first entertainment file into the second re-sized entertainment file and store it in the memory 38 in place of the first entertainment file. This would free up memory space in the memory 38 in the portable electronic device 10 while preserving the original first entertainment file in the second device 34, and while still allowing the re-sized entertainment file to be retained with the first device 10 for viewing/listening. In a preferred embodiment the original image file remains in the first device 10 while the re-sized image file is being created in the first device. After the re-sized image file has been created, the first device can automatically delete the original image file to thereby replace the original image file with the re-sized image file. Rather than being automatic, the first device could prompt the user to delete the original image file from the first device. Thus, the first device could retain both versions (the original version and the re-sized version) if desired; at least for a limited amount of time. The first device 10 could be programmed to warn the user if the original image file has not been copies to the second device before deletion occurs. The first device 10 could also be programmed to acknowledge to the user that the original image file has been copied to the second device before deletion occurs.

As noted above, as an alternative to a fully automatic system, the converting system could require a user to initiate the conversion process before the entertainment file(s) are re-sized after transmitting a copy to the second device. For example, after transmitting the copy(ies) of the entertainment file(s) to the second device 34, the converting system 42 could prompt the user whether or not one or more of the transmitted entertainment file(s) should be re-sized. The user could then select none, one or more, or all of the transmitted files for re-sizing. The user could also select one or more or the files for deletion by the deleting system 46.

The deleting system 46 could also automatically selectively delete one or more types of files after transmission of the copy, such as relatively large size MPEG video files for example. Alternatively, the user could be prompted at the same time with the option of deleting one or more transmitted files or alternatively re-sizing the files. Automatic re-sizing and/or deletion could also be based, at least partially, on the amount of available free space in the memory. If the free space is relatively large, the automatic process might not occur; perhaps only a prompt suggestion would be provided to the user to delete or re-size the files. If the free space is relatively small, the automatic process might then be programmed to occur.

The determining system 44 could be used to determine which ones of the entertainment files in the memory 38 have been copied or transmitted from the first device 10 and which ones of the entertainment files in the memory 38 have not been copied or transmitted from the first device 10. For example, after an entertainment file has been copied or transferred from the first device 10, the file or its re-sized equivalent could be marked, such as with a flag, to indicate that it has been copied or transferred from the first device 10. The determining system 44 could be adapted to look for that marker for determining first ones of a plurality of image files in the portable electronic device which have been copied or transmitted from the portable electronic device and for determining second ones of the plurality of image files which have not been copied or transmitted from the portable electronic device. The determining system 44 could then be used to help control transmission of the files from the memory 38 to limit transmission to only the second image files, thereby speeding up transmission time and preventing duplicate or unnecessary files in the second device 34 (including duplicate original files and unnecessary re-sized files). This can provide a system for selectively copying or transmitting the second entertainment files in the portable electronic device, which have not been previously copied or transmitted from the portable electronic device, to the second device based, at least partially, on the system for determining without copying or transmitting the first entertainment files (or the re-sized files in the memory) to the second device at a same time.

The determining system could comprise a system for comparing the image files in the first portable electronic device to image files in the second device to determine which of the image files in the first portable electronic device are the first image files and which of the image files in the first portable electronic device are the second image files. The system for permanently converting could comprise an automatic system based upon a predetermined event, such as relatively small free space in the memory 38 for example. The system for permanently converting could comprise a user activated system before re-sizing occurs.

Figure 4:
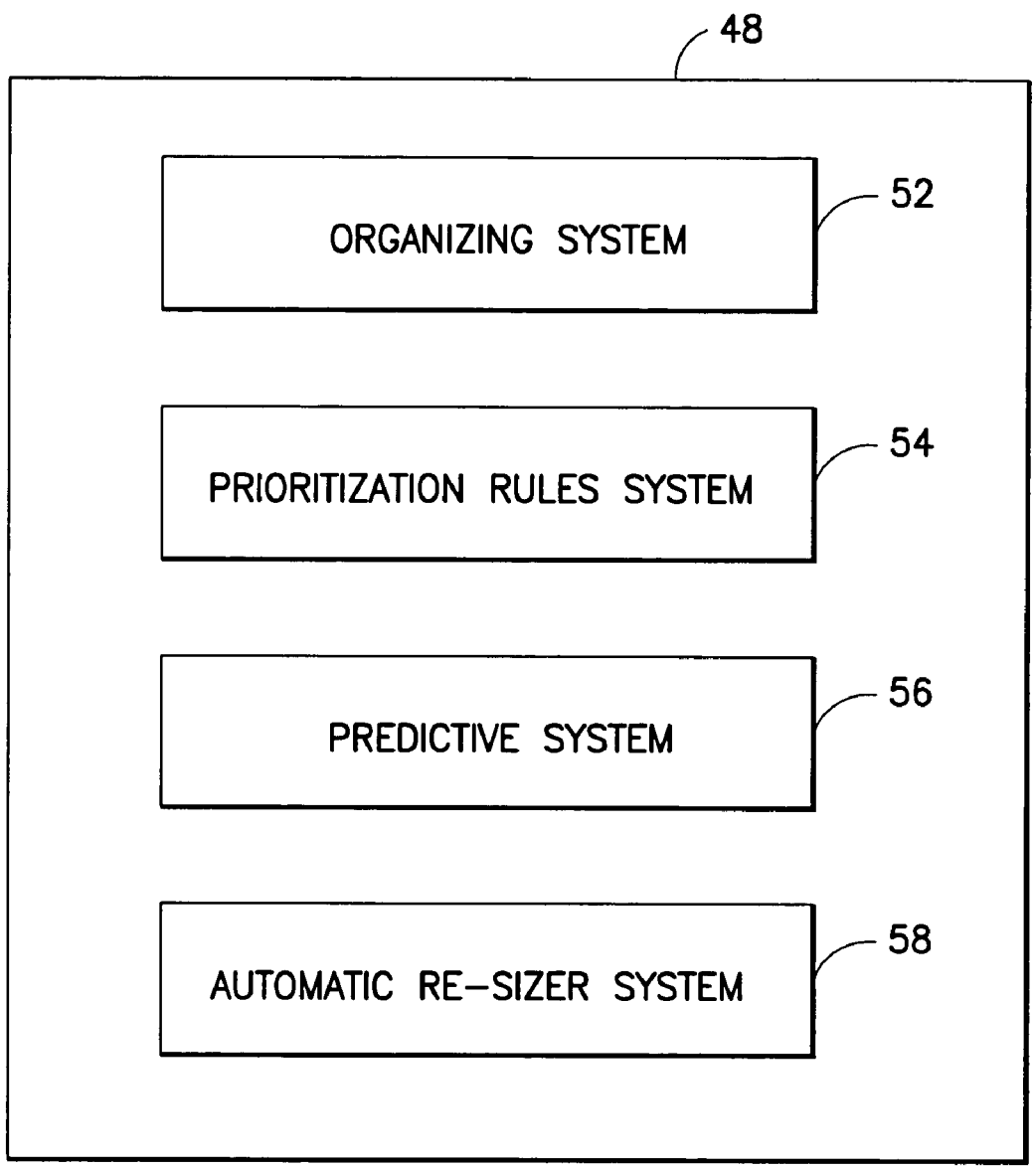
FIG. 4 is a block diagram of an optional suggesting system of the telephone shown in FIG. 3.

The portable electronic device 10 can comprise the suggestion system 48. Referring also to FIG. 4, the suggestion system 48 can comprise an organizing system 52, a prioritization rules system 54, a predictive system 56 and an automatic re-sizer system 58. The re-sizer system 58 can comprise the converting system 42, memory 38, transferring system 40 and determining system 44. The organizer system 52 can comprise a system for organizing the entertainment files in the memory into classifications. For example, the classifications could be file folders of topics, such as Family, Vacation, Birthday, Baby Pictures, Video Files versus Picture Files, etc. Thus, the classifications could comprise user selected classifications. Another classification could comprise an automatic backup determination classification indicating that a backup of the file has occurred. Any suitable type of classification(s) could be provided. In one type of embodiment, the classifications are not based upon time or date of creation of the entertainment file. The user could select one or more classifications for the entertainment file(s) and/or one or more of the classifications could be automatically selected by the device 10. The classifications would preferably be attached to the entertainment files.

The prioritization rules system can provide the user with rules for prioritization of deletion or permanent re-sizing of the entertainment files based, at least partially, upon the classifications of the entertainment files. For example, the rules could comprise a rule for re-sizing all MPEG files when free space on the memory reaches a pre-determined amount, and a rule for re-sizing JPEG files only after MPEG files have been re-sized, and never re-size files in the Baby Pictures folder. Alternatively, and/or additionally, the rules could comprise usage statistics whereby each image file has an associated score. The usage statistics score could accumulate or change based upon predetermined events, such as when the image file is shared (e.g. sent to another user or device), printed or viewed, for example. The sharing, printing or viewing may be given different weights in the score. Other predetermined factors could also be given to the score. Multiple different scores (including factors other than usage) could also be used, and perhaps combinations of the scores could be used. Different scores could also be given different priorities in an overall combined scoring system. These are only examples. Other prioritization rules could also be applied. The rules could also be based upon whether or not a file has been transferred from the first device 10 to the second device 34.

The predictive system 56 can be used to predict or anticipate when additional space will be needed for the user in the memory 38 for storing additional entertainment files and perhaps taking anticipatory actions to accelerate re-sizing or deletion of files when the user finally agrees to a re-sizing or deletion. Because re-sizing (or another permanent memory freeing process) may involve procedures that take time and processing capability, the invention can be further improved by having methods available on the mobile device 10 to predict when and for what content the memory freeing tools should be taken and, accordingly, doing the memory freeing procedures in advance, so that if the prediction was correct, the actual step will be instantaneous for the user when the user activates the tool. In an alternate embodiment, the predictive system might not be provided.

Local memory in a portable electronic device, such as a camera phone, is limited. As users take pictures, videos and audio recordings the memory card or local memory will fill up over time. A portable electronic device, such as a telephone terminal, can be stolen or lost, or a memory card can be broken so that valuable images and videos are lost. Memory management with the currently offered tools is often inconvenient and difficult.

Users want to carry images with them on a portable electronic device so that they can show them to their friends, send them as multimedia messages, or use some other online/offline services offered by operators and other companies.

offering end-users easy-to-use tools to move their valuable images to a reliable storage can solve the problems mentioned above. However, making room on a device by moving images to a backup storage and carrying a catalogue of valuable images on the device are seemingly conflicting requirements. With the present invention both of these conflicting requirements can be met.

The present invention can be a combination of the following elements:
- Easy-to-use and perhaps automatic tools, both for a PC and the device, that make backup copies of those images and videos that have not previously been backed up.
- A trace mechanism where information of those images that have been backed up is preserved in the device among with other metadata elements.
- Tools for emptying the device memory or a memory card later, when the need arises. Target of emptying operations can be those images have been backed up earlier. These can be identified using the trace mechanism.
- As step 3 may involve procedures that take time and processing capability (like re-sizing images), the invention can be further improved by having methods available on the mobile device to predict when and for what content the tools noted above should be taken, and accordingly doing the procedures in advance, so that if the prediction was correct, the actual step will be instantaneous for the user when the user activates the tool.

Sometimes, when images are copied from a digital camera phone to a PC, the files are deleted from a memory card of the camera immediately after the copy is made in order to make room for new images. With the present invention the files need not be deleted from the phone after a backup because the memory can be freed later when the real need arises (memory-on-demand).

An example of a backup method could comprise the following. The user connects the phone to the PC with an available local connection technique (such as a cable, Bluetooth, etc.). A process in the PC can detect the connection and can propose to the user that new images could be copied to the PC. If user accepts, new images are copied and trace information can be written back to the file in the phone.

An example of a memory-on-demand method could comprise the following. When the user is taking new images or videos the free memory may go below a preset limit (such as absolute, as measured in e.g. megabytes, or relative, as measured in e.g. percentage of available free memory). At this point the phone can present the user the option to re-size images or delete previously backed-up content. An automatic backup after a cable connection could be made, or after a phone is brought in Bluetooth or WLAN vicinity of the PC, an automatic backup could be the most convenient for the user.

Alternative options could include:
The user starting the backup process.
Images being pushed from the phone to the PC using Bluetooth.
Providing a local connection, such as USB cable, Bluetooth or WLAN.
Use of a target device that is also a portable electronic device, such as a CE device.
Providing a connection which is remote to the target device, such as a WLAN hotspot, or GPRS.
Providing a remote connection initially to a temporary storage. Images are copied to final storage device later.

Options for trace implementation can comprise, for example:
Writing a log file back to the phone. Phone gallery/organizer reads the log file after the backup process and updates internal databases.
Developing an API in PC Suite.

Freeing memory can be done either by deleting images and videos, or by re-sizing images. Re-sizing images to another size or resolution (e.g. normal TV screen resolutions) will benefit in a big save in memory consumption, but still fill most of users needs for carrying those images with them on the move. For "re-sizing" videos, a video clip can be "time-compressed" to a video trailer (extreme example in Muvee application), or replaced with one or more still images generated from the video.

For example, images taken with a Nokia 6630 camera phone are 1280×960 pixels and the file size can be over 700 kB. VGA resolution images (640×480) are close to normal TV resolution (720×576 in Europe) and are suitable for TV viewing. The size of a VGA image can easily be only 70 kB, thus providing 10:1 saving in required memory.

Alternatives to manually invoked freeing of memory can comprise:
Emptying the memory automatically if the user has so agreed (memory-on-demand).
Emptying process is started by use.
Emptying process is started by camera application.
Emptying process is started by other application or operating system that has the rights to require more memory.

The advanced use cases (remote & automatic connection) require that settings have been done in advance. Automatic emptying of memory requires that user can select images that should not be deleted or re-sized. This can happen on a case-by-case basis, or it can be based on other metadata attributes (e.g. user selects that all images taken at "Home", or that belong to collection "Baby" are to be carried with the user). The user created content is copied to a place where it can be consumed in a versatile way. User can make further physical backup copies of the content by further burning the files on CD/DVD from PC. Content is protected against phone loss or memory card failures.

The user can almost always take more pictures. Copying is affordable. The user feels that a manufacturer using features of the present invention in their products has taken end-to-end responsibility for convenient photography/imaging process. Tools can enable a user to carry with them a big collection of valuable pictures. This also provides an emotional value. The present invention provides a value for operators because users can use online services as they have more content with them in their portable devices. Tools can differentiate the manufacturer's camera phones from other digital cameras and camera phones not having the invention and provide a marketing advantage.

The invention outlines that, as handsets incorporate higher resolution sensors, there becomes a need to provide greater storage area for saving the captured images. Users may currently organize images by saving them to a MultiMedia Card (MMC) or to a PC for later retrieval. However, images stored remotely cannot be shared "portably" by using the handset. It is also not possible to retain all images on the handset because the MMC for example has a defined storage area. There is, therefore, a conflict between being able to portably move the captured images so they are always on hand and having a storage medium large enough to keep all captured images in the portable device.

With the present invention, a user can capture an image and later decide to move the captured image to another storage medium (e.g. PC or networked storage area). When the image is copied a flag can be set within the handset indicating that the image has been transferred or copied. When the local storage in the handset becomes full, the handset can preferably rescale images already stored locally based upon, for example:
any images which have a "flag" set, and/or
the use of a preferred user list (e.g. try and avoid images in certain folders being re-sized firstly (e.g., pictures of family)).

Re-sizing should not be confused with compressing images. By re-sizing the user is able to free space within the memory for further image capture, but cannot "un-size" the image back to the original. The user must refer to the remotely saved image for the original image file. This allows the user to be able to view a large collection of images in a "reduced format" or re-sized format. The use of a "flag" can be as broad as possible, such as for re-sizing, backup, deletes etc.

The invention can be a basis for the whole idea of carrying large amounts of images with the user. This can potentially be an alternative of hard-disk based devices such as IPOD Photo. If, using the reduction technology, users can carry their photos on a phone and do not need to buy an extra device, that should be significant for the user.

The feature of re-sizing can provide a restriction that the re-sized image cannot be restored to its original size and quality without reference to the duplicated archived image. However, in view of the fact that a backup copy has preferably been made, there is still availability of the image file in its original form, and there is increased availability with the retained re-sized files; which would not be provided so available if the image was simply deleted from the portable electronic device.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus comprising:
   a memory having a first image file;
   a system for transferring a copy of the first image file to a device; and
   a system for permanently converting the first image file to a different second image file based, at least partially, upon the copy of the first image file being transferred to the device by the system for transferring, wherein the second image file cannot be converted back to the first image file by the apparatus,
   wherein the system for transferring comprises a system for comparing the first image file to image files in the device and not transferring the copy of the first image file to the device if the device already comprises a copy of the first image file.

2. An apparatus as in claim 1 wherein the system for transferring comprises a radio telephone link.

3. An apparatus as in claim 1 wherein the system for permanently converting the first image file to a different second image file comprises permanently re-sizing the first image file.

4. An apparatus as in claim 1 wherein the system for transferring a copy comprises:
   a system for determining transmitted ones of a plurality of image files in the apparatus which have been copied or transmitted from the apparatus and for determining untransmitted ones of the plurality of image files which have not been copied or transmitted from the apparatus; and
   a system for selectively copying or transmitting the untransmitted image files in the apparatus, which have not been previously copied or transmitted from the apparatus, to the device based, at least partially, on the system for determining, without copying or transmitting the transmitted image files to the device at a same time.

5. An apparatus as in claim 1 wherein the system for transferring comprises a system for indicating with the first image file that a copy of the first image file has been transferred.

6. An apparatus as in claim 1 further comprising a system for suggesting to a user whether or not the first image file should be permanently converted, the suggesting system comprising:
   a system for organizing entertainment files into classifications, wherein the entertainment files comprise the first image file;
   a system for providing user rules for prioritization of deletion or permanent re-sizing of the entertainment files based, at least partially, upon the classifications of the entertainment files; and
   a system for providing the user with a suggestion of at least one of the entertainment files for deletion or permanent re-sizing based upon a predetermined event, the prioritization rules, and the classifications of the entertainment files.

7. An apparatus as in claim 1 wherein the system for permanently converting is adapted to replace the first image file with the second image file.

8. An apparatus comprising:
   a memory having a first image file;
   a system for transferring a copy of the first image file to a device; and
   a system for permanently converting the first image file to a different second image file based, at least partially, upon the copy of the first image file being transferred to the device by the system for transferring, wherein the second image file cannot be converted back to the first image file by the apparatus,
   wherein the system for permanently converting retains both the first image file and the second image file in the apparatus for at least a limited amount of time.

9. An apparatus comprising:
   a system for connecting the apparatus to a device to transmit image files from the apparatus to the device;
   a system for determining first ones of the image files in the apparatus which have been copied or transmitted from the apparatus and for determining second ones of the image files which have not been copied or transmitted from the apparatus; and
   a system for selectively copying or transmitting the second image files in the apparatus, which have not been previously copied or transmitted from the apparatus, to the device based, at least partially, on the system for determining, without copying or transmitting the first image files to the device at a same time,
   wherein the apparatus is configured to retain both the second image files and compressed copies of the second image files in the apparatus for at least a limited amount of time.

10. An apparatus as in claim 9 wherein the system for coupling comprises a wireless link.

11. An apparatus as in claim 9 wherein the system for determining comprises each of the first image files comprising a marker which the second image files do not comprise.

12. An apparatus as in claim 9 wherein the system for determining comprises a system for comparing the image files in the first portable electronic device to image files in the second device to determine which of the image files in the first portable electronic device are the first image files and which of the image files in the first portable electronic device are the second image files.

13. An apparatus as in claim 9 wherein the first portable electronic device further comprises a system for permanently converting at least one of the first image files to a different re-sized image file based, at least partially, upon the copy of the first image file having been transferred to the second device, wherein the re-sized image file cannot be converted back to the at least one first image file by the portable electronic device.

14. An apparatus as in claim 13 wherein the system for permanently converting comprises an automatic system based upon a predetermined event.

15. An apparatus as in claim 13 wherein the system for permanently converting comprises a user activated system before re-sizing occurs.

16. An apparatus as in claim 15 wherein the system for permanently converting comprises a system for suggesting to the user whether or not the first image file should be permanently converted, the suggesting system comprising:
   a system for organizing entertainment files into classifications, wherein the entertainment files comprise the first and second image files;

a system for providing user rules for prioritization of deletion or permanent re-sizing of the entertainment files based, at least partially, upon the classifications of the entertainment files; and a system for providing the user with a suggestion of at least one of the entertainment files for deletion or permanent re-sizing based upon a predetermined event, the prioritization rules, and the classifications of the entertainment files.

17. A method comprising:

organizing entertainment files into classifications;

providing user rules for prioritization of deletion or permanent re-sizing of the entertainment files based, at least partially, upon the classifications of the entertainment files; and providing a user with a suggestion of at least one of the entertainment files for deletion or permanent re-sizing based upon a predetermined event, the prioritization rules, and the classifications of the entertainment files.

18. A method as in claim 17 wherein organizing the entertainment files into classifications comprises a user selected classification.

19. A method as in claim 17 wherein organizing the entertainment files into classifications comprises an automatic backup determination classification.

20. A method as in claim 17 wherein organizing the entertainment files into classifications comprises a classification not based upon time or date of creation of the entertainment file.

21. A method comprising:

transmitting a copy of a first entertainment file from a first portable electronic device to a second device; and permanently re-sizing the first entertainment file in the first portable electronic device into a second re-sized entertainment file based, at least partially, upon a determination that the first entertainment file has been copied, wherein the second re-sized entertainment file cannot be converted back to the first entertainment file by the first portable electronic device, wherein the method comprises the first portable electronic device comparing the first entertainment file to entertainment files in the second device and not transferring the copy of the first entertainment file to the second device if the second device already comprises a copy of the first entertainment file.

22. A method as in claim 20 further comprising the first portable electronic device retaining both the first entertainment file and the second entertainment file in the portable electronic device for at least a limited amount of time.

* * * * *